Aug. 31, 1926.
W. J. BAYNES
1,597,950
APPARATUS FOR EJECTING ICE CREAM FROM PACKAGES
Filed Nov. 24, 1925   3 Sheets-Sheet 1
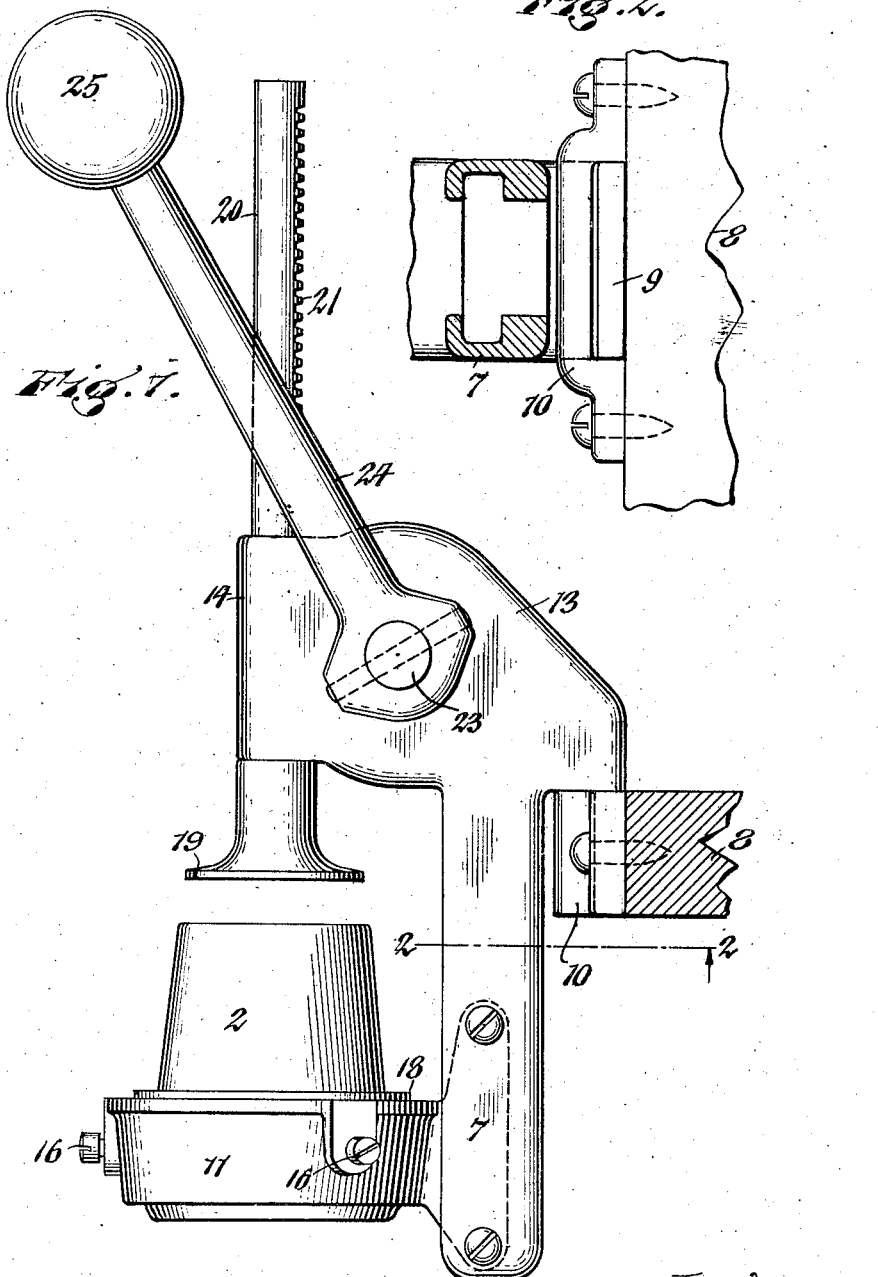

Aug. 31, 1926.  
W. J. BAYNES  
1,597,950  
APPARATUS FOR EJECTING ICE CREAM FROM PACKAGES  
Filed Nov. 24, 1925  3 Sheets-Sheet 2
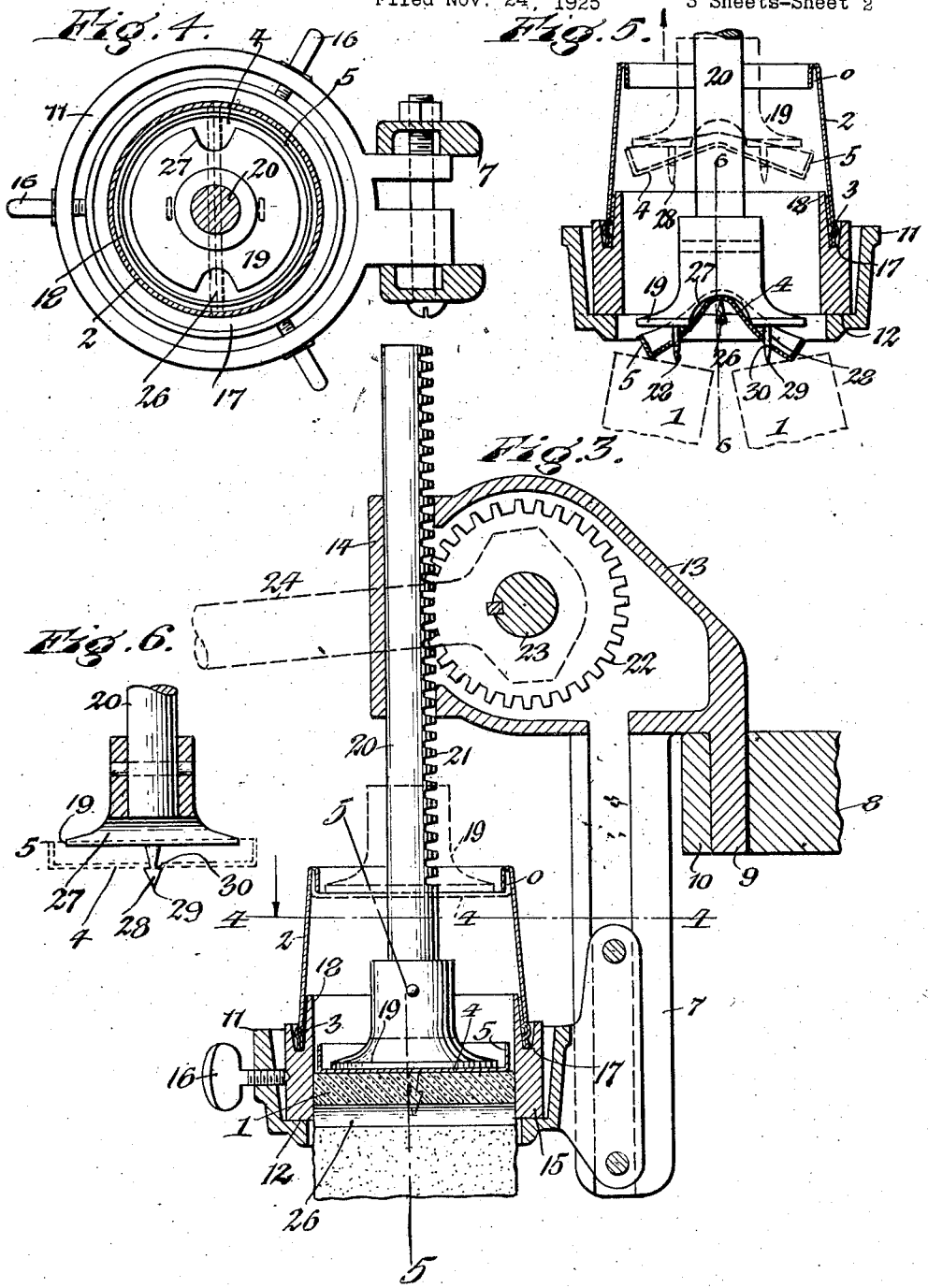

Aug. 31, 1926.
W. J. BAYNES
1,597,950
APPARATUS FOR EJECTING ICE CREAM FROM PACKAGES
Filed Nov. 24, 1925      3 Sheets-Sheet 3
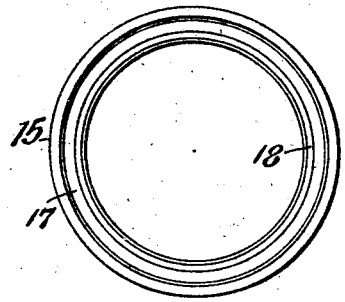
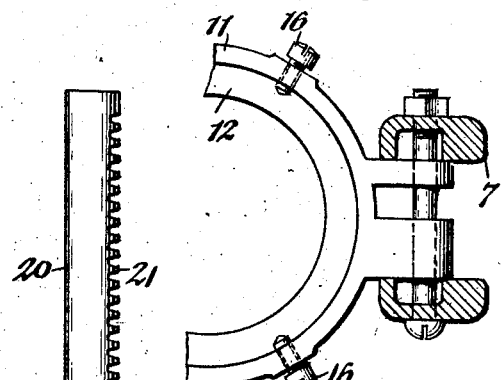
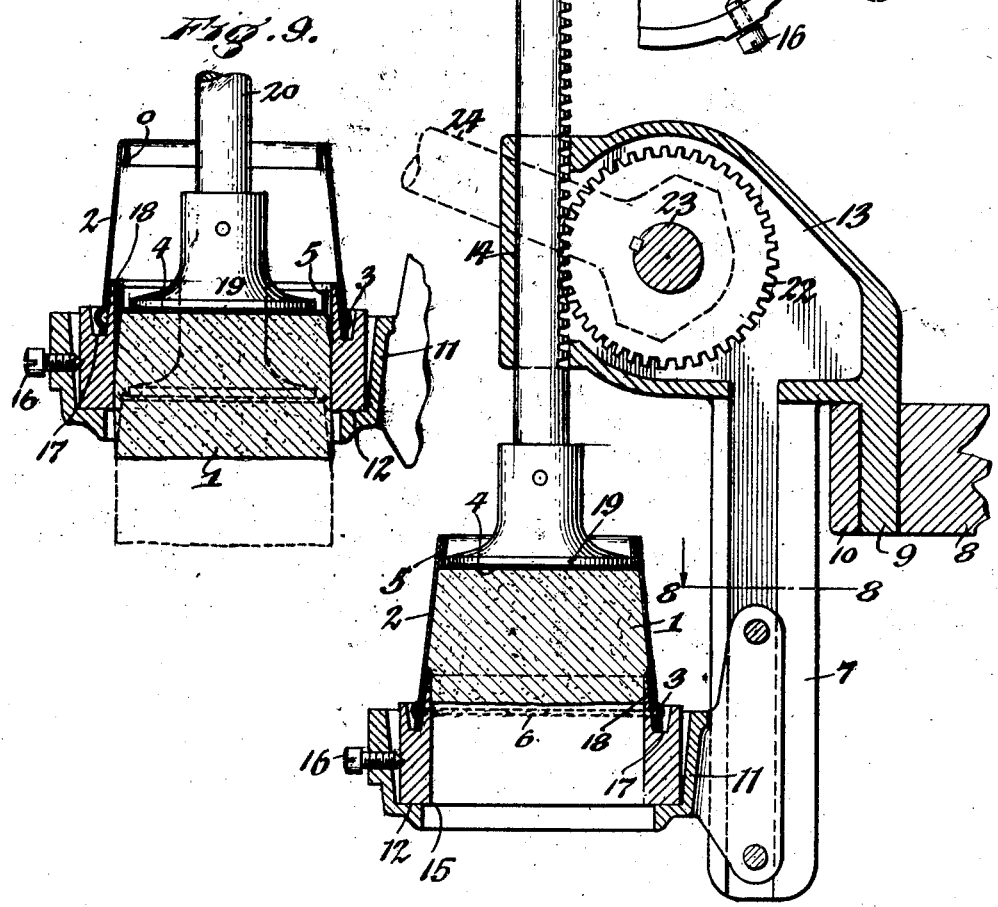
Inventor
William J. Baynes
By Popp & Powers
Attys.

Patented Aug. 31, 1926.

1,597,950

UNITED STATES PATENT OFFICE.

WILLIAM J. BAYNES, OF BUFFALO, NEW YORK.

APPARATUS FOR EJECTING ICE CREAM FROM PACKAGES.

Application filed November 24, 1925. Serial No. 71,109.

This invention relates to an apparatus for ejecting the contents of ice cream packages or containers for serving the same to customers.

Ice cream at the present time is packed in packages having an upright side wall or body, a bottom removably connected with the small or lower end of the wall, and a top or cover removably connected with the top or upper end of the wall.

Heretofore it has been the practice in dispensing ice cream in such packages to first remove the cover by any suitable means and then push the bottom and contents of the package by the hand toward the top of the latter so that the contents and bottom are removed from the wall into a dish or other receptacle after which the bottom is lifted by a suitable instrument from the ice cream before the latter is served in one piece.

This method of serving the ice cream is objectionable because the removal of the same from the container by contact with hands is unsanitary, the removal is difficult, slow and irregular, a separate operation is necessary to remove the bottom, and a separate operation is also required to divide the ice cream if it is to be served in a plurality of portions.

It is the object of this invention to provide an apparatus for ejecting ice cream or the like from packages or containers with expedition and certainty of maintaining the contents in the proper form; also to effect such removal without permitting the wall of the package to collapse or become deformed; also to provide means for dividing the contents into sections and fully ejecting the same from the package; and also provide means automatically removing the bottom of the package from the lower end of the ice cream block and thus avoid the necessity of a separate operation for this purpose.

In the accompanying drawings:

Figure 1 is a side elevation of an ejecting apparatus embodying one form of my invention and showing the plunger elevated.

Figure 2 is a horizontal section of the same taken on line 2—2 Fig. 1, looking upwardly.

Figure 3 is a vertical longitudinal section of the ejecting apparatus showing the plunger partly depressed.

Figure 4 is a horizontal section taken on line 4—4 Fig. 3 looking downwardly.

Figure 5 is a fragmentary vertical cross section taken on line 5—5 Fig. 3, and showing the plunger fully depressed.

Figure 6 is a fragmentary vertical section taken on line 6—6 Fig. 5.

Figure 7 is a vertical longitudinal section of a modified form of the ejecting apparatus and showing the plunger engaged with the bottom of the package.

Figure 8 is a fragmentary horizontal section taken on line 8—8 Fig. 7 looking downwardly.

Figure 9 is a fragmentary vertical longitudinal section similar to Fig. 7 but showing the plunger in a depressed position.

Figure 10 is a top plan view of the supporting and retaining ring forming part of my improvements.

In the following description similar characters of reference indicate like parts in the several figures of the drawings.

The form of package or container, from which the ice cream block 1 is to be removed by the ejecting mechanism embodying the preferred form of my invention, consists generally of a conical downwardly tapering wall or body 2 provided on the inner side of its lower edge portion with an upwardly opening channel 0 and on the inner side of its upper edge portion with an inwardly opening groove 3, a bottom 4 having a downwardly projecting marginal flange 5 adapted to engage said channel, and a top or cover 6 adapted to engage its edge with the groove 3 in the assembled position of the parts, as shown by dotted lines in Fig. 7.

The several members of the package are preferably made from card board and the ice cream block is filled into the space within the assembled wall and bottom and then the top or cover is sprung into the groove 3, thereby completing the packing of the block of ice cream so the same is completely closed and ready to be shipped, stored or dispensed.

Although the main frame of this apparatus may be of any suitable construction the same preferably consists of an upright bar 7 adapted to be arranged in front of a table 8 or other support and detachably mounted thereon by means of a hook 9 depending from the upper front part of this bar and adapted to engage with a loop 10 secured to the front edge of the table, as shown in Figs. 1, 2, 3 and 7, thereby permitting the apparatus to be removed from the table for more readily cleaning the same and also stowing the same away when not required.

On its lower part the frame bar 7 is provided with a forwardly projecting supporting ring 11 which has its axis arranged vertically and which is provided at its lower edge with an inwardly projecting annular flange or shoulder 12. At its upper end the frame bar is provided with a gear housing 13 and at its front part this housing is provided with a vertical guideway 14 which is preferably arranged coaxial with the supporting ring 11.

Removably mounted on this supporting ring is a retaining ring 15 which is adapted to receive the upper edge portion of the wall of the package, after the cover top has been removed therefrom and hold the same in place while the contents of the package are removed therefrom. This retaining ring is normally arranged within the supporting ring and rests with its underside on the flange thereof and it is held against displacement by a plurality of set screws 16 arranged in radial openings in the supporting ring and engaging with the periphery of the retaining ring, as shown in Figs. 1, 3, 4, 7, 8 and 9. On its upper side the retaining ring is provided with an annular centering groove or channel 17 which is adapted to receive the large end of the wall of the package and engage the bottom of this groove with the upper edge of this wall while the package is in an inverted position, and this retaining ring is also provided on the inner side of its groove with an upwardly projecting retaining flange 18 having an upwardly tapering outer surface adapted to engage with the inner side of the upper edge portion of the container, as shown in Figs. 3, 5, 7 and 9 and thereby reliably holding the wall of the package against collapsing or distortion when a downwardly pressure is applied to the bottom of the package and the contents therein for removing the same therefrom.

The numeral 19 represents a vertically movable plunger adapted to engage the face on its under side with the underside of the package bottom while the package is resting in an inverted position on the retaining ring and to push this bottom together with the contents of the package downwardly in the wall thereof and eject the contents from the open upper end of the wall which at this time is lowermost, as shown in Figs. 5 and 9.

A vertically reciprocating movement is imparted to this plunger by means which preferably consist of a vertically movable shifting rod 20 sliding in the guideway 14 and provided on its rear side with a vertical gear rack 21, a gearwheel 22 arranged in the housing 13 and meshing with the gear rack, a horizontal shaft 23 journaled transversely in the housing and carrying said gear wheel, and a crank arm 24 connected with one end of this shaft and provided with a handle 25 for manipulating the same.

In the absence of any other provision the block of ice cream will be ejected in one piece from the large end of the container, as shown in Fig. 9.

For the purpose, however, of dividing the block of ice cream when the same is ejected and thus facilitate its complete ejection and removal from the bottom of the package the following means are provided:

The numeral 26 represents a cutter blade arranged diametrically across the lower end of the space within the retaining ring and preferably supported at its opposite ends on the bore of this ring adjacent to the lower side thereof, as shown in Figs. 3, 4, and 5. On its underside or face and parallel with the cutter blade the plunger is provided with a diametrical groove 27 which in the lower position of the plunger is adapted to receive the cutter blade while those parts of the plunger on opposite sides of this groove are adapted to straddle the cutter blade and pass downwardly below the same. By this means the block of ice cream during the last part of the downward movement of the plunger is severed into two pieces, and the central part of the bottom of the package is arrested by the blade before the plunger reaches its lowermost position while those parts of the bottom on opposite sides of the central part are bent downwardly and folded toward each other by those parts of the plunger on opposite sides of its groove engaging with side parts of the bottom during the last part of the downward movement of the plunger, whereby the ice cream block sections are squeezed away from the bottom and the latter is automatically detached from the ice cream, as shown in Fig. 5. No separate hand operation is therefore required for this purpose, thereby saving time and also rendering the serving of ice cream more sanitary.

For the purpose of facilitating the removal of the package bottom from the bottom of the block of ice cream means are provided whereby the package bottom is caused to adhere to the plunger as the same performs its downward ejecting action and is again raised into its uppermost position preparatory to ejecting the ice cream block from another package. The preferred means for this purpose consists of spurs 28, preferably two in number and projecting downwardly from the face of the plunger on opposite sides of its groove 27. Each of these spurs preferably has a downwardly tapering lower part which terminates in an edge 29 which is comparatively sharp and at a distance from this lower edge the spur is provided with upwardly facing shoulders 30, so that this spur resembles an arrow, as shown in Figs. 3 and 6. As the plunger descends these spurs penetrate the package or container bottom, as shown by dotted lines in Fig. 3, and during the upward movement of the plunger the upwardly facing shoulders of the spurs engage with the inner side of the package bottom as shown in Figs. 5 and 6, and causes the bottom to be lifted above the package wall when the plunger reaches its uppermost position, thereby enabling the wall and bottom to be conveniently removed from the apparatus after the ice cream has been ejected and thus permit of dispensing the ice cream with facility and under the most sanitary conditions inasmuch as the human hands are at no time brought into contact with the ice cream while the same is being ejected from the container into the serving dish.

If the means for automatically removing the bottom of the container from the ice cream and the cutting of the same into two pieces is not desired, the cutter blade on the retaining ring and the groove and spurs on the face of the plunger may be omitted, as shown in the construction of the apparatus illustrated by Figs. 7 and 9, the same in other respects being like that shown in the remaining figure, and the description of the corresponding parts, therefore applying to both forms of this apparatus.

I claim as my invention:

1. An apparatus for ejecting ice cream from a package having a side wall and a bottom, comprising a retaining ring adapted to be engaged by the upper edge of the side wall and provided with a flange adapted to engage with the inner side of said wall and a plunger adapted to engage said bottom and push the same toward the top thereof together with the contents therein.

2. An apparatus for ejecting ice cream from a package having a downwardly tapering side wall and a bottom removably fitted in the lower part of the side wall, comprising a retaining ring adapted to be engaged by the upper edge of said side wall and provided with a flange having a conical outer side adapted to engage the inner side of said body, and a plunger adapted to engage the bottom of the package and push the same together with the contents therein toward the top thereof.

3. An apparatus for ejecting ice cream from a package having a side wall and a bottom, comprising a retaining ring provided with an annular groove adapted to receive the upper edge of said wall and having a flange adapted to engage with the inner side of said wall, and a plunger adapted to engage said bottom and push the same toward the top thereof together with the contents therein.

4. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein, a frame provided with an arm upon which said ring is mounted and also with a guideway in line with said ring, a shifting rod sliding in said guideway, and means for reciprocating said shifting rod.

5. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein, a frame provided with an arm upon which said ring is mounted and also with a guideway in line with said ring, a shifting rod sliding in said guideway, and means for reciprocating said shifting rod comprising a gear rack formed on said shifting rod, a gear wheel pivotally mounted on said frame and meshing with said rack, and a handle connected with said gear wheel.

6. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein, a frame upon which said supporting ring and plunger are mounted, a stationary support, and means for maintaining said frame detachably with said support comprising a loop attached to said support, and a hook arranged on said frame and engaging with said loop.

7. An apparatus for ejecting the contents of an ice cream package having a side wall and a detachable bottom, comprising a retaining ring adapted to engage with the upper edge of said wall, a plunger adapted to engage the bottom and push the same together with the contents of the package toward the top thereof, and a cutter blade extending across the space within said retaining ring and adapted to sever the contents of the package into sections as the contents are pushed against this blade by the plunger.

8. An apparatus for ejecting the contents of an ice cream package having a side wall and a detachable bottom, comprising a retaining ring adapted to engage with the upper edge of said wall, a plunger adapted to engage the bottom and push the same together with the contents of the package toward the top thereof, and a cutter blade extending across the space within said retaining ring and mounted at its opposite ends on the opposite sides of said ring, and adapted to sever the contents of the package into sections as the contents are pushed against this blade by the plunger.

9. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein and means on said plunger for causing the bottom to become attached thereto.

10. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein and means on said plunger for causing the bottom to become attached thereto comprising a spur arranged on the face of the plunger and adapted to pierce said bottom.

11. An apparatus for ejecting ice cream from a package having a side wall and a bottom, comprising a retaining ring adapted to be engaged by the upper edge of the side wall and provided with a flange adapted to engage with the inner side of said wall, a plunger adapted to engage said bottom and push the same toward the top thereof together with the contents therein and means on said plunger for causing the bottom to become attached thereto comprising a spur arranged on the face of the plunger and adapted to pierce said bottom said spur having backwardly facing shoulders in rear of its end for engaging the inner side of said bottom.

12. An apparatus for ejecting ice cream from a package having a side wall and a bottom removably engaging the lower part of said wall, comprising a retaining ring adapted to engage the upper edge of said wall, a plunger adapted to engage said bottom and push the same together with the contents of the package toward the upper end of the same, and a cutter blade arranged across the space within the retaining ring and adapted to be engaged by the contents of the package which are pushed against the same by the plunger for dividing the contents into sections, said plunger being provided on its face with a diametrical groove which is adapted to receive said cutter blade and the central part of the bottom arrested by said blade while the face portions of said plunger on opposite sides of said groove are adapted to engage with those parts of the bottom on opposite sides of the blade and bend them forwardly relatively to the central part and thereby detach the contents of the package from the bottom.

13. In an apparatus for dispensing ice cream, a container support having an opening therethrough and onto which a tapering ice cream container is to be placed in an inverted position, a stripper element carried by said container support and adapted to enter said container with its stripping edge in contact with the interior surface of said container, and a pressure device exerting pressure against said ice cream to remove the same en masse from said container.

WILLIAM J. BAYNES.